United States Patent [19]

Regennitter et al.

[11] 4,278,841
[45] Jul. 14, 1981

[54] MULTIPLE STATION TEMPERATURE MONITOR SYSTEM

[75] Inventors: Jack Regennitter, 1734 E. 3015 South, Salt Lake City, Utah 84106; Ronald C. Ward, Salt Lake City, Utah

[73] Assignee: Jack Regennitter, Salt Lake City, Utah

[21] Appl. No.: 87,254

[22] Filed: Oct. 22, 1979

[51] Int. Cl.³ .......................................... H04M 11/04
[52] U.S. Cl. ..................................... 179/5 R; 340/585
[58] Field of Search .................. 179/2 A, 2 AM, 5 R, 179/5 P; 340/505, 539, 585, 164 R

[56] References Cited

U.S. PATENT DOCUMENTS

| | | | |
|---|---|---|---|
| 3,811,112 | 5/1974 | Hoven et al. | 340/164 R |
| 3,848,231 | 11/1974 | Wootton | 340/164 R |
| 4,028,688 | 6/1977 | Goleman | 340/585 |

Primary Examiner—Raymond F. Cardillo, Jr.
Assistant Examiner—Joseph A. Popek
Attorney, Agent, or Firm—Trask & Britt

[57] ABSTRACT

A plurality of detector units are positioned to sense the refrigerated air temperature of a refrigerated air supply to a retail frozen food case or counter. The detector units are battery powered and supply a modulated radio frequency output reflecting the existence of a temperature condition integrated over time together with identification codes identifying a particular detector unit. A receiver unit receives the transmitted radio frequency signal, demodulates and decodes the signal, and supplies an output to an alarm unit. The alarm unit develops the alarm signal and supplies it to an indicator, as well as to an external alarm circuit which is a phone dialer which automatically dials a phone number in an external telephone system. In addition, the detector unit periodically generates an operational check signal which is also transmitted to and decoded by the receiver unit and supplied to the alarm unit. The alarm unit indicates the existence of the operational check signal. In the absence thereof, it causes generation of an alarm signal to be generated.

7 Claims, 15 Drawing Figures

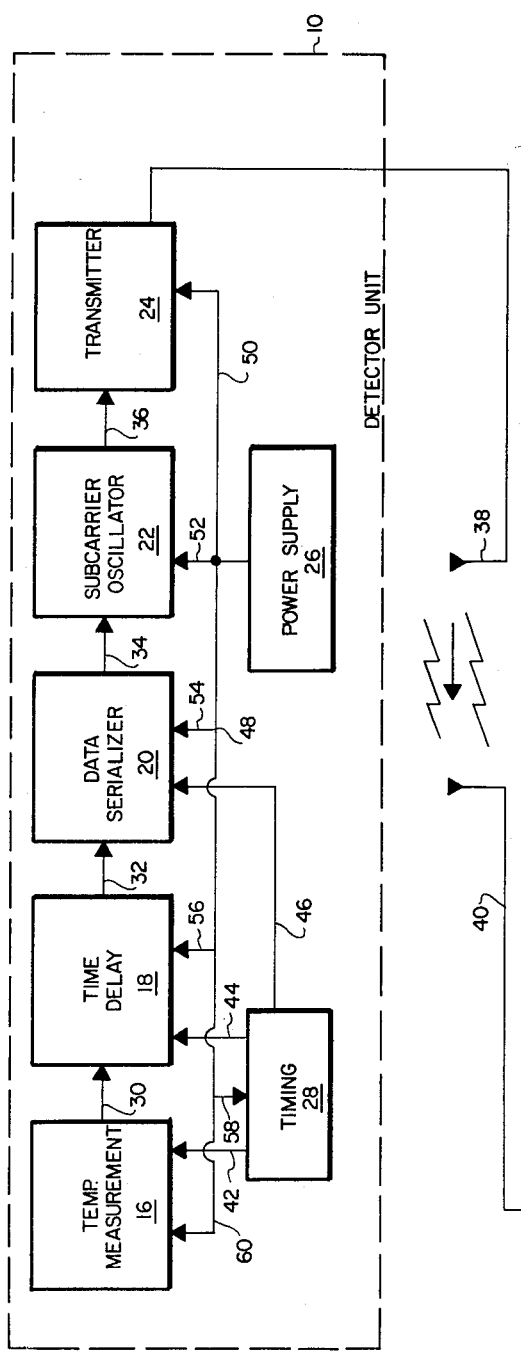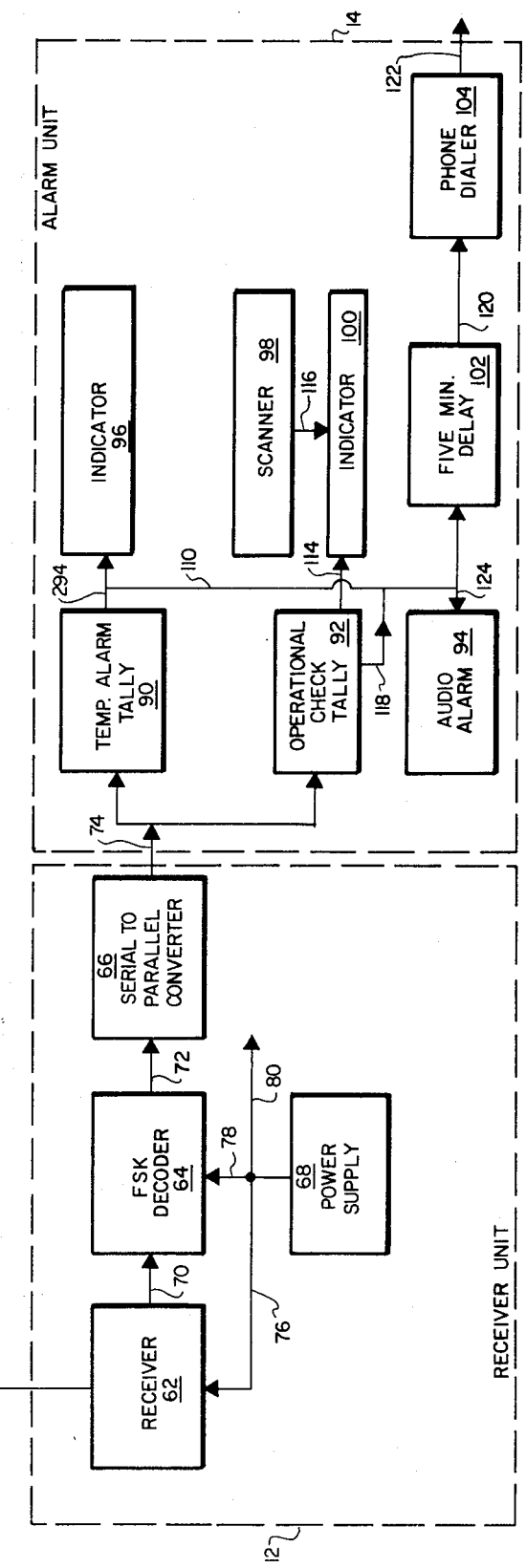
Fig. 1

MULTIPLE STATION TEMPERATURE MONITOR SYSTEM

BACKGROUND OF THE INVENTION

1. Field

This invention relates to refrigeration monitoring systems, and more particularly to retail frozen food display case refrigeration monitoring systems.

2. State of the Art

Food distribution systems today include frozen food items which are made available at the retail distribution level in retail frozen food cases or counters. A typical frozen food case is an elongated counter with a refrigeration system which supplies a blanket of very cold air to maintain the frozen food items positioned or placed therein in a frozen condition while permitting customers reach-in access to the food items. Failure of the refrigeration system supplying the cold air to the refrigerated case is a known occurrence and one which occurs perhaps all too frequently. Various alarm circuits have been suggested to alert personnel of the existence of a failure in the refrigeration system to preclude losses by the thawing of the frozen food placed in the case.

U.S. Pat. No. 4,028,688 (Goleman) suggests an alarm system which supplies an alarm signal when the frozen food case air temperature reaches a preset point. The alarm signal is transmitted to a receiver which immediately causes an external phone dialer to dial an external phone number. U.S. Pat. No. 3,707,851 (Mcashan Jr.) discloses a refrigeration efficiency monitoring system. U.S. Pat. No. 3,594,749 discloses a system for monitoring the refrigeration system of display cases using what appears to be thermal-bulb gas connections to macroswitches. U.S. Pat. No. 3,234,749 (Quick) discloses a refrigeration system having therein an alarm system to alert the operator of malfunctions. U.S. Pat. No. 3,415,070 (Weum) also discloses a refrigeration warning system.

The refrigeration alarm systems heretofore known frequently rely upon extensive wiring or piping connections to transmit alarm signals or other data related thereto. In today's supermarkets or similar retail food outlet facilities, wiring or piping may be unacceptable. Further, the cost of installing extensive wiring and piping may be quite prohibitive. In addition, the systems heretofore known, including specifically the system of Goleman, do not provide for the integration of an alarm signal or a time delay to preclude spurious or random alarms. The existence of random or spurious alarms is quite undesirable in that it conditions monitoring personnel to not take immediate corrective action upon the existence or occurrence of an alarm. The food losses related to the failure of refrigeration systems at the same time is quite high and can exceed several thousand dollars per year for a typical supermarket having one or more frozen food cases or counters. An improved alarm system not requiring wiring or piping and further providing for the integration of a signal and also for an operational check from time to time of the detector system itself is desirable.

SUMMARY OF THE INVENTION

A temperature monitoring system for frozen food display cases includes a plurality of detector units. Each detector unit has temperature measuring means positioned to sense the air temperature of a refrigerated space to generate a temperature alarm signal reflective of a preselected alarm temperature condition. Time delay means is conductively connected to the temperature measuring means to receive the temperature alarm signal therefrom, to integrate it, and thereafter transmit it after a preselected time delay as an alarm signal. A data serializer receives the temperature alarm signals and internally generates a preselected identification code unique to each detector. The alarm signal and the identification code are converted into a serialized data train. A frequency shift key subcarrier oscillator converts the serialized data train into a modulated subcarrier signal. A transmitter transmits the alarm signal in a modulated format to a receiver, which in turn demodulates the signal.

The detector unit also has a timing circuit which supplies timing signals to components thereof to cause intermittent operation in accordance with the preselected schedule. The detector unit also generates an operational check signal and transmits an operational check signal to the receiver unit periodically.

The receiver unit is positioned remote from the detector unit and receives the alarm signal and the operational check signals from the detector unit. The receiver demodulates the signals and supplies the demodulated signal to the frequency shift key decoder which decodes the signal and converts it into a serialized data train. A serial to parallel converter converts the data train into a plurality of parallel in time data signals.

An alarm unit is conductively connected to the receiver unit to receive the data signals therefrom. A temperature alarm tally circuit receives the alarm signals and generates an alarm signal indicative of the existence of an alarm condition and the identity of the detector unit from which the alarm condition has been transmitted. The temperature alarm tally circuit also causes indicator means to indicate the existence and the identity of the detector unit sending the alarm signal. The temperature alarm tally also supplies a signal to external alarm means to receive the alarm signal therefrom and indicate the existence thereof external from the alarm unit.

In a preferred embodiment, the operational check signals are supplied to the alarm unit which has an operational tally circuit which monitors the receipt thereof, and upon receipt thereof indicates the operational status of the detector unit. In the absence of a periodically received operational check signal, the operational check tally circuit supplies an alarm signal to an external alarm means.

The external alarm means preferably includes delay means to receive the alarm signals and delay transmission thereof. A phone dialer receives the delayed signal from the delay means and generates an external dialing signal to dial a telephone in an external dial system to supply an alarm signal thereto. The alarm signal may include a message circuit to supply either a verbal or other audible signal upon the answering of the external telephone.

BRIEF DESCRIPTION OF THE DRAWINGS

In the drawings, which illustrate the best mode presently contemplated for carrying out the invention, FIG. 1 is a simplified block diagram of a temperature alarm system of the instant invention;

FIG. 11 is a time reference circuit to supply time reference signals in the alarm unit of the temperature alarm system of the instant invention;

FIG. 12 is a reference signal related to the scanner circuit in the alarm unit of the temperature alarm system of the instant invention;

FIG. 13 is a circuit diagram of a delay circuit for use in the alarm unit of the temperature system of the instant invention;

FIG. 14 is a battery alarm circuit for use in the alarm unit of the temperature alarm system of the instant invention.

DESCRIPTION OF THE ILLUSTRATED EMBODIMENT

Figure 2:
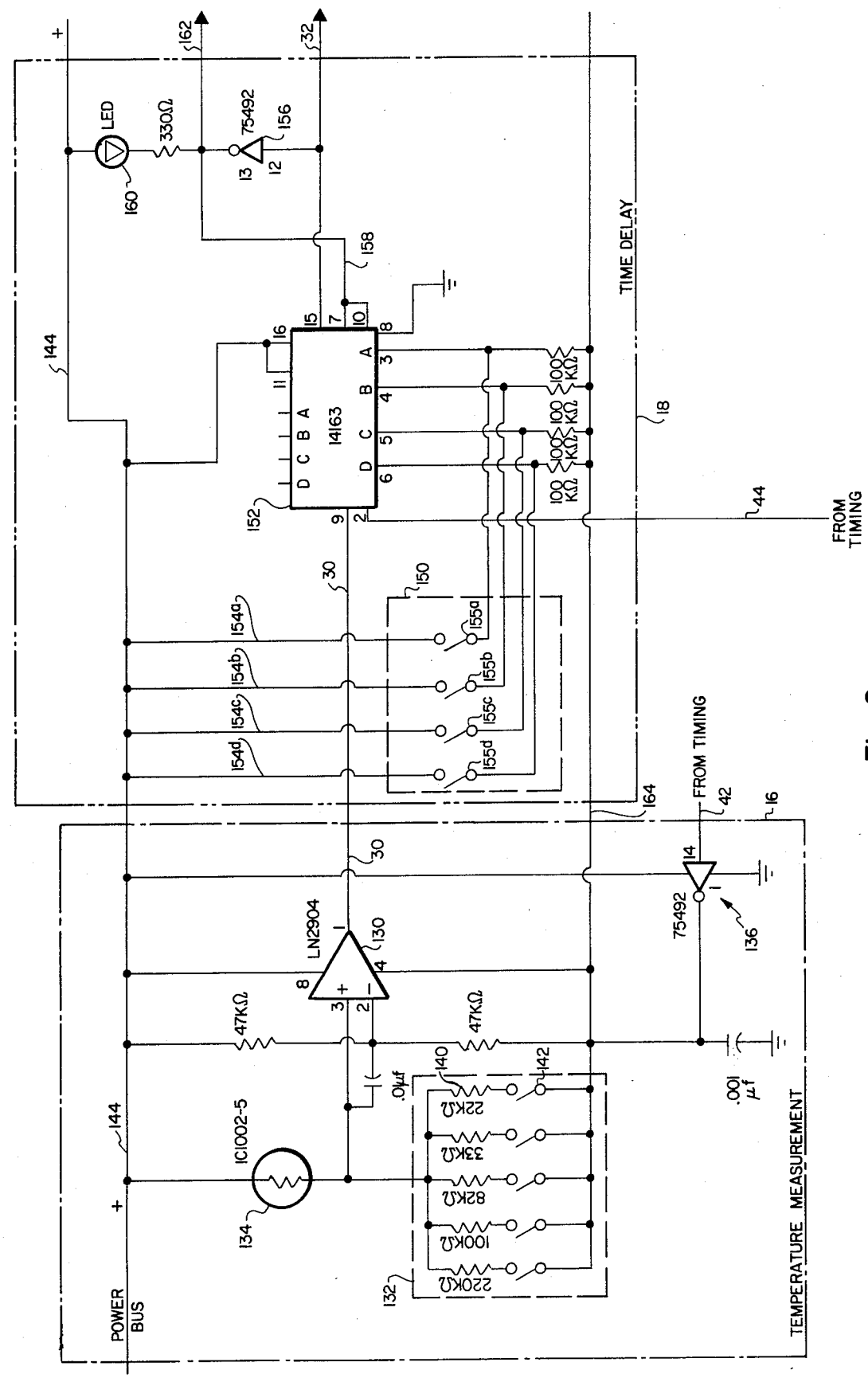
FIG. 2 is a circuit diagram of a temperature measuring circuit and a time delay circuit for use in detector units of temperature monitoring system of the instant invention.

FIG. 1 is a simplified block diagram illustrating both the detector unit 10, a receiver unit 12 and an alarm unit 14. The detector unit 10 includes temperature measuring means which is a temperature measurement circuit 16, a time delay circuit 18, a data serializer 20, a subcarrier oscillator 22, a transmitter 24, a power supply 26, and a timing circuit 28.

The temperature measuring circuit 16 supplies an output signal to a time delay circuit via conductor 30. The temperature measurement circuit 16 measures the air temperature of the supplied to a refrigerated area. When the temperature reaches a certain preset point, an alarm signal is generated by the temperature measuring means and supplied to the time delay circuit 18 via conductor 30. The time delay circuit 18 integrates and delays the alarm signal measured insuring the existence of a valid alarm signal. The alarm signal is supplied via conductor 32 to the data serializer 20.

The data serializer 20 receives the alarm signal and generates internally an identification code unique to a particular detector unit 10. The alarm signal and the identification code are converted into a serialized data train and transmitted via conductor 34 to the subcarrier oscillator 22. The subcarrier oscillator 22 converts the serialized data train by a frequency shift key operation into an output signal which can be regarded as a radio frequency modulated output signal. In other words, the data is reflected as variations of a subcarrier signal. That output signal is supplied via conductor 36 to the transmitter 24. The transmitter 24 generates a RF carrier signal which is modulated by the subcarrier. It supplies a modulated radio frequency output signal to the receiver unit 12 via antenna 38 and the receiver unit antenna 40. That is, the transmitter transmits the signal to the remote location of the receiver unit 12.

The receiver unit 12 is located remote from the detector units and in a place to be observed by operators or users, as desired. The receiver unit 12 receives transmission from the plurality of detector units via antenna 40. The receiver unit 12 has a receiver 62, a frequency shift key (FSK) decoder 64, a serial to parallel converter 66 and a power supply 68.

The receiver 62 receives the RF transmission from the transmitter 24 and demodulates them into a signal comparable to the output of the subcarrier oscillator 22 in the detector unit 10. The FSK decoder 64 decodes the modulated signal received from the receiver 62 via conductor 70 and supplies a serialized data train 72 to the serial to parallel converter 66. The serial to parallel converter converts the serialized data train into parallel in time signals or data signals for further transmission to the alarm unit 14 via conductor 74.

A power supply 68 is shown conductively connected to the receiver unit via conductor 76, to the FSK decoder via 78, and to other components of both the receiver unit 12 and the alarm unit 14 via representative conductor 80. The power supply 68 receives power from an external source and supplies it to the various components, as above stated. It may be noted that the power supply 68 includes a dry cell battery so that in the event of the failure of the external power supply, the system would continue to operate.

The alarm unit 14 receives the data signals from the serial to parallel converter 66 via conductor 74. The alarm unit 14 includes a temperature alarm tally circuit 90, an operational check tally circuit 92, an audio alarm circuit 94, a first indicator 96, a scanner 98, a second indicator 100, a five minute delay circuit 102, and a phone dialer 104.

The temperature alarm tally circuit 90 receives the data signals from the serial to parallel converter 66 and supplies an alarm signal as well as a signal identifying the detector unit 10 supplying the alarm signal to the indicator 96. It also supplies an alarm signal via conductor 110 to the delay circuit 102. The delay circuit receives the alarm signal, and after a preselected time delay, supplies the signal to the phone dialer 104. The phone dialer 104 automatically dials a preselected telephone number in an external telephone system and supplies an alarm signal upon the answering of that telephone. The telephone dialer 104 repeatedly or periodically dials the phone number until the phone external to the temperature alarm system is answered.

The alarm signal from the temperature alarm tally 90 is also supplied to an audio alarm 94 which generates an audible alarm in the vicinity of the alarm 14 and receiver unit 12, which are preferably positioned within a single chassis.

The operation check tally circuit 92 receives operational check signals from each detector unit 10 via the receiver unit 12 and supplies an indication of the operational status of each detector unit 10 to the indicator 100. The scanner 98 provides a scanning signal and a flashing signal to the indicator 100, as more fully discussed hereinafter.

The timing circuit 28 of the detector unit 10 supplies a check pulse via conductor 46 to the data serializer 20 at preselected intervals. The check pulse causes the data serializer 20 to operate by generating the identification code to constitute an operational check pulse signal. The operational check pulse signal is converted into a serialized data train for modulation and transmission as a modulated radio frequency signal by the subcarrier oscillator 22 and transmitter 24, the same as the alarm signal. The receiver unit 12 receives the operational check pulse signal as a modulated radio frequency transmission and processes the same in the same manner as an alarm signal producing at the output of the serial to parallel convertor 66 an operational check pulse signal.

The operational check tally circuit 92 receives the operational check pulse signal via conductor 74 and conductor 112. The operational check tally circuit 92 generates a detector operative signal upon receipt of the operational check pulse signal and an alarm signal upon the absence of said operational check pulse signal over a preselected period of time. The detector operative signal is supplied via conductor 114 to the second indicator 100. The scanner 98 supplies control signals via conductor 116 to the indicator, which in combination with the detector operative signal, causes the indicator means to indicate that the sending detector unit 10 is in fact operative. Upon the absence of the operational check signal, the alarm signal is supplied by the operational check tally circuit 92 via conductor 118 and conductor 110 to the external alarm means.

The power supply 26 is a battery pack selected to operate the detector unit 10 for an extended period, which may exceed one year. The power supply 26 is conductively connected to the various circuits of the detector unit 10 via conductors 48, 50, 52, 54, 56, 58 and 60.

As here illustrated, the external alarm means is comprised of the five minute delay circuit 102 and the phone dialer 104. The five minute delay circuit 102 receives the alarm signal from either the operational check tally circuit 92 or the temperature alarm tally circuit 90 and transmits the alarm signal after a preselected time delay, which in this embodiment is about five minutes. The alarm signal is transmitted by the five minute delay circuit via conductor 120 to the phone dialer 104. The phone dialer 104 automatically dials a preselected phone number repetitively and periodicially for a preselected number of redials to an external phone system via conductor 122. The phone dialer 104 has means to supply an alarm signal message upon the answering of the telephone in the external telephone system 120, not here illustrated. An audio alarm circuit 94 may be also conductively connected via conductor 124 to receive alarm signals from the temperature alarm tally 90 and the operational check tally 92 to generate an audio alarm signal locally at the situs of the alarm unit 14.

Referring now to FIG. 2, a temperature measurement circuit 16 is shown in greater detail. The circuit 16 includes an amplifier 130, a temperature set point adjuster 132, a temperature sensitive thermistor 134 and a current amplifier 136. The set point adjuster 132 is comprised of a plurality of separate discrete switches which are manually operated to selectively connect various resistances 140 into circuit with the thermistor 134. Different resistances do in turn vary the threshold current at which the amplifier 130 transmits an output. The thermistor 134 is positioned to specifically sense the air temperature to be measured or sensed. The thermistor output current supplied to the amplifier 130 is controlled not only by the internal variable (with temperature) resistance of the thermistor 134, but also the electrical resistance 140 connected in circuit in the temperature set point adjuster 132. It may be noted that the temperature set point adjuster 132 is comprised of a plurality of resistances 140 and a matching plurality of manually operated switches. Those skilled in the art will recognize that devices are readily available to act as the switches 142.

As the air temperature in a refrigerated space increases, the output current of the thermistor increases in relation thereto. That current is supplied to the amplifier 130. Upon reaching a preselected threshold current, the amplifier 130 supplies an output signal (which is the "too hot" signal) via conductor 30 to the time delay circuit 118. It may be also noted that the temperature measurement circuit 16 receives an input via conductor 42 from the timing circuit 28, which input is amplified by the auxiliary current amplifier 136. The output of the current amplifier 136 is supplied directly to the amplifier 130 as an input and to the temperature set point adjuster 132. The timing signal is a periodic pulse (about every 5 minutes) which in effect causes the temperature measuring circuit to function and check or measure the air temperature. It may also be noted that the temperature measurement circuit receives power from a bus 144, which is more simply illustrated in FIG. 1 as conductors 48 and 60.

The time delay circuit 18 is shown in FIG. 2 as having a manual digital integrator 150 and a counter 152. The manual integrator circuit 150 receives power from the bus 144 via conductors 154a, 154b, 154c, and 154d. The integrator 150 supplies a preset numerical counting signal to the time delay counter 152. The manual integrator circuit 150 has switch members 155a through 155d, each of which represents a particular binary number so that if all switches 155 are closed, the binary number of 15 is supplied to the counter circuit 152. The counter circuit 152 in turn counts the number of too hot signals received from the temperature measurement circuit 16 via conductor 30. When the counter 152 counts a sufficient number of too hot signals received from the temperature measurement circuit 16, it supplies an output temperature alarm signal via conductor 34 to the data serializer 20. It also supplies a too hot temperature indication to a lock-in amplifier 156, which in turn supplies a signal to the counter 152 via conductor 158 to freeze the counter at the count of 15 in a high condition after it has counted 15 too hot signals from the temperature measurement circuit 16. The amplifier 156 also supplies a signal to a light emitting diode 160 which is positioned to indicate external the chassis of the detector unit to show the existence of an alarm condition to any observer. The amplifier 156 also supplies an output temperature alarm condition via conductor 162 to any other alarm indicating means desired by the user. The time delay circuit 18 also receives power from the power supply 28 via power supply bus 144, as illustrated.

In operation, the timing circuit 28 supplies an operative count or temperature check signal to the temperature measurement circuit 16 via conductor 42 while at the same time supplying a count signal to the time delay circuit 18 via conductor 44. The temperature check signal causes the temperature measurement circuit 16 to operate. If the total output to the amplifier 130 is of sufficient level, the amplifier has an output which constitutes a too hot signal which is in turn supplied directly to the counter 152 which is also enabled by the counter operate signal received simultaneously via conductor 44. The check temperature signal supplied via conductor 42 and the counter operate signal supplied via conductor 44 are supplied by the timing circuit 28 on a regular periodic basis which in this embodiment is about every five minutes. Thus, the temperature of the air to be sensed or monitored is checked every five minutes. If a too hot condition exists for a preselected period of time, which is selected by the integrator circuit 150, then the time delay circuit 18 has an output indicating an alarm condition. In the instant embodiment, if the manual integrator 150 is set for a total of fifteen counts, the too hot condition must exist for fifteen consecutive five minute periods or for fifteen consecutive too hot signals. Thus, the too hot condition must exist for a preselected period of time, which in this embodiment is selected to be 75 minutes. This delay or integration of too hot signals precludes the generation of spurious alarms. At the same time the 75 minute period is not so excessive that the overall alarm system is unresponsive and would not provide sufficient warning for users to take steps to preclude damage to contents of a refrigerated area, such as frozen foods positioned in a particular retail frozen food display case which is being monitored by a particular detector unit 10. The current output of the current amplifier 136 is also supplied to the integrator 150 and the counter 152 via conductor 164. The same current is also supplied to the data serializer via conductor 166 to operate the ID code selector 168, as hereinafter discussed.

Figure 3:
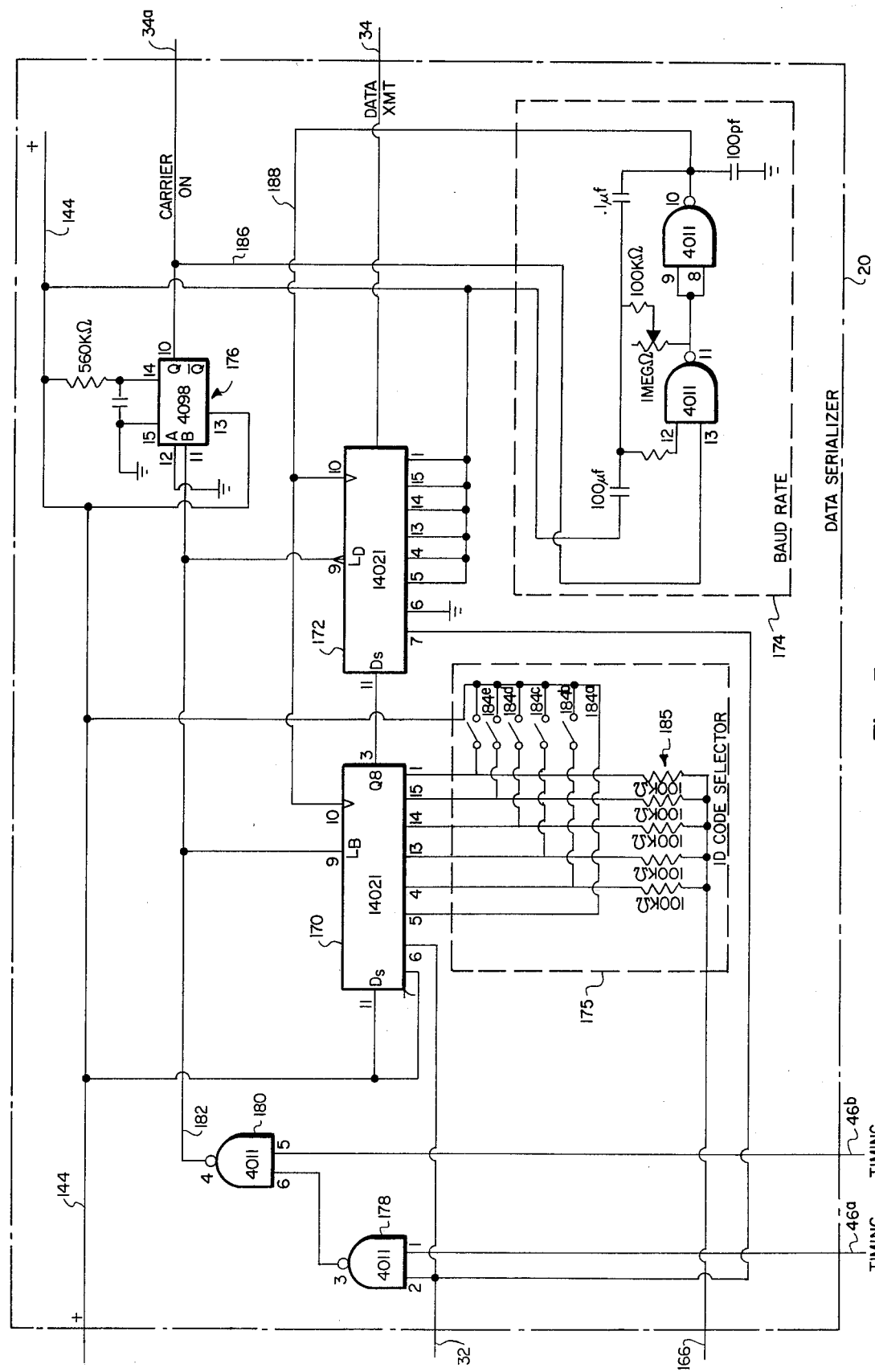
FIG. 3 is a circuit diagram of a data serializer for use in the detector unit of the temperature monitoring system of the instant invention.

As hereinbefore stated, the output of the time delay circuit 18 is supplied to the data serializer 20 (FIG. 1) via conductor 34. The data serializer 20, which can be used and is shown in FIG. 3, includes a pair of shift registers 170 and 172, a baud rate circuit 174, the ID code selector 175 and a mono-stable multi-vibrator circuit 176. The data serializer 20 also receives power from the power supply 26 via the positive bus 144, as illustrated. The too hot signal or alarm signal received from the time delay circuit 18 is supplied to two logic circuits 178 and 180 which also receive timing pulses from the timing circuit 28 (shown in FIG. 1 as conductor 46) via conductors 46a and 46b. The timing circuit signals are enable or logic signals supplied substantially simultaneously with the check temperature signal and the counter enable signal supplied to the time delay circuit 18 and the temperature measurement circuit 16, as hereinbefore discussed. With an alarm signal present at the output of the time delay on conductor 32 simultaneous with timing signals on conductors 44a and 44b, a high output signal emanates from the second and circuit 180 on conductor 182. The high output signal from the second and circuit 180 in turn activates the two shift registers 170 and 172, as well as the mono-stable multi-vibrator circuit 176.

An identification (ID) code unique to the particular detector unit 10 is manually set into the data serializer 20 by manually operating the switches 184a through 184e in FIG. 3. The switches 184, in conjunction with the resistors 185, are operated to be selectively open or closed to set in a binary word or number which is selected and unique to each detector unit 10. The two shift registers 170 and 172 when operated serialize the ID code selected, as well as the existence of a too hot signal. The output of the shift registers 170 and 172 is supplied via conductor 34 upon secondary activation of the shift registers 170 and 172 by the baud rate circuit 174.

The baud rate circuit 174 may be regarded as an oscillator or clock for data training. The data comprised of the ID code selected and the existence of a too hot condition is shifted out of the registers 170 and 172 with spacing between bits. The baud rate or the number of changes of state per second is controlled by the baud rate circuit 174 illustrated. The baud rate is initiated by the mono-stable multi-vibrator 176 and controlled thereby via conductor 186. The output of the baud rate circuit 174 is supplied to the two shift registers 170 and 172 via conductor 188. The output of the mono-stable multi-vibrator 176 is also supplied to the subcarrier oscillator 22 via conductor 34a, as more fully discussed hereinafter.

It can be seen that upon the presence of an alarm or too hot signal from the time delay circuit 18, the data serializer 20 in turn generates an appropriate data train containing information which is the ID code selected in the ID code selector 168 and the existence of a temperature alarm signal.

Figure 4:
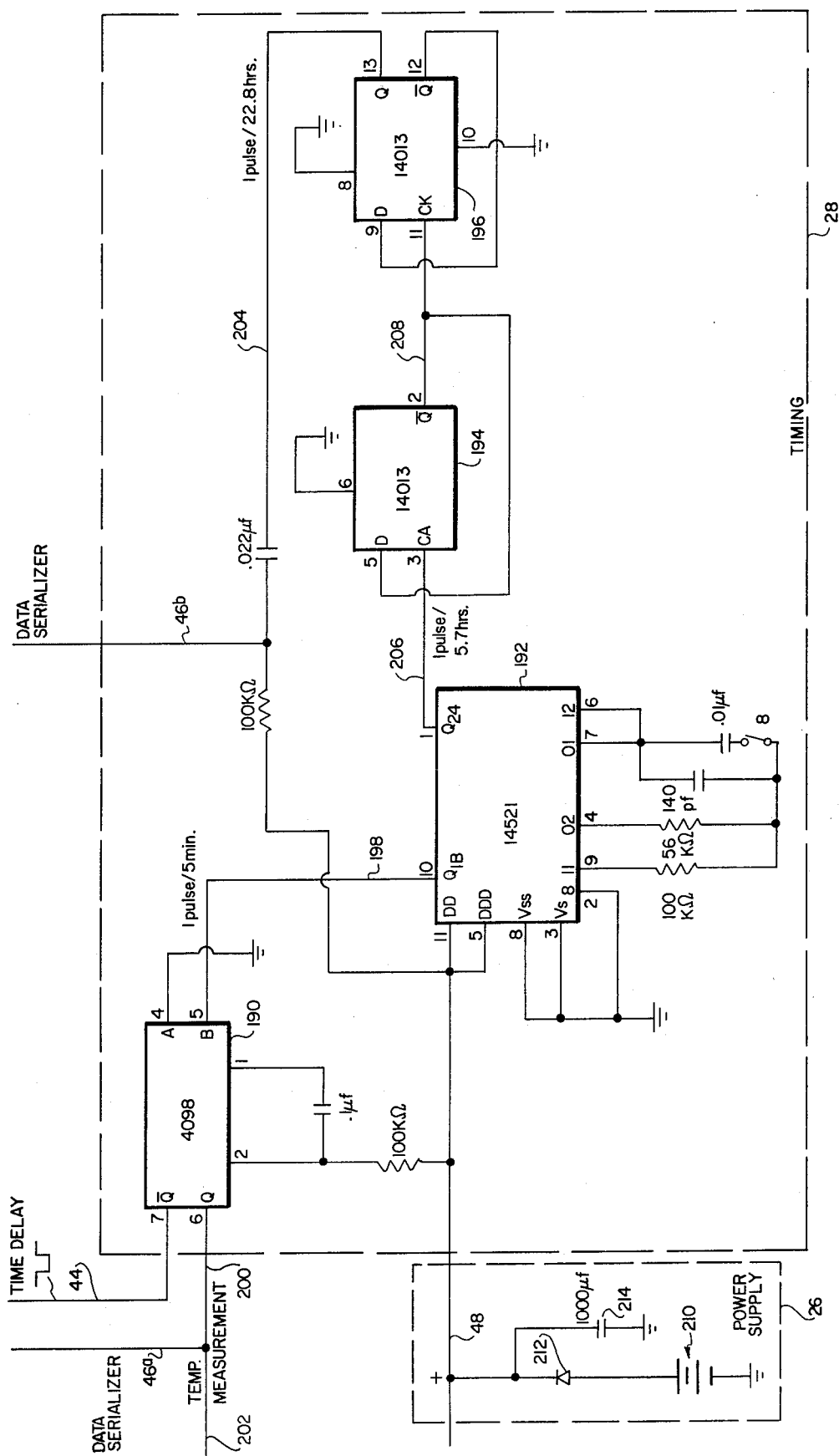
FIG. 4 is a circuit diagram of a timing circuit and a power supply for use in the detector unit of the temperature monitoring system of the instant invention.

FIG. 4 illustrates a timing circuit 28 which is comprised of a mono-stable multi-vibrator 190, an oscillator and counter 192, and a pair of pulse counters 194 and 196. The timing circuit 28 receives power from the power supply 26 via conductor 48. The oscillator and counter 192 supplies one output pulse periodically, and in this embodiment every five minutes, via conductor 198 to the mono-stable multi-vibrator 190 to in turn activate the mono-stable multi-vibrator 190. The mono-stable multi-vibrator 190 in turn supplies several output timing signals. The first is a square wave output supplied via conductor 44 to the time delay circuit 18. The second is a check temperature signal supplied to the temperature measurement circuit 16 via conductors 200 and 202. The third is an operate or enable signal supplied to the data serializer 20 via conductors 200 and 46a. The data serializer 20 also receives an enable signal from the pulse counters 194 and 196 via conductors 204 and 44b. The pulse counter 194 receives a timing pulse via conductor 206 from the oscillator 192. The timing pulse is supplied every 5.7 hours. The first pulse counter 194 supplies one output pulse for every two input pulses it receives. Similarly, counter 196 supplies one output pulse on an output 204 for every two input pulses that it receives. Thus, there is an output generated by the second pulse counter 196 approximately once every 22.8 hours. The output pulse of the second counter 196 constitutes an operational check pulse which is supplied to the data serializer 20 via conductors 204 and 44b to activate the data serializer to supply a data train comprised of the ID code selector signal to indicate if the operational readiness and the operational characteristics of the detector unit 10. As more fully discussed hereinafter, the operational check pulse is supplied to demonstrate to the receiving unit the existence of an operative and ready detector unit 10. The timing circuit pulses and causes temperature measurements to be made approximately once every five minutes, and causes the those signals are extant. This data is received by the receiving unit 12, decoded and supplied to the operational tally 92 and temperature alarm tally 90 circuits. Additional time delays are built into the alarm unit 14 signal processing to again preclude spurious alarms.

Each of the detector units 10 can be conveniently positioned proximate a refrigerated area, which include walk-in freezers and coolers, refrigerated display cases and any other device or apparatus which contains frozen or cool items. However, a frozen food case is most applicable and susceptible to monitoring hereby. The detector is conveniently positionable without the need for cumbersome wiring, tubes or other forms of sensing or connecting equipment. The detector 10 is relatively small and unobtrusive, and can be positioned readily without modification of present existing installations. A detector unit 10 may be placed in each of the cases in a store with one receiver alarm unit positioned in the backroom, or some other convenient place where personnel would be a position to frequently observe and monitor the detector unit. The receiving and alarm units are powered by conventional 115 volt AC power from a convenient outlet. The receiver and alarm units 12 and 14 are combined into one chassis for convenience and have indicating lights thereon, which are the light emitting diodes hereinbefore described to indicate the operational status of each of the detectors, as well as the existence or absence of an alarm condition. In addition a battery alarm is provided in case the power supply becomes defective and the overall system is inoperative. The phone dialing capability is provided to transmit an alarm signal or an alarm message external the store or the retail establishment in case of failure when personnel are not in a position to observe within the store.

It may be noted that the system, as herein described, conceptionally precludes many spurious alarms which can be obtained in systems heretofore known. CB transmitters, garage door transmitters and other types of radio frequency signals in the vicinity of the retail food establishment can frequently cause spurious alarms on RF type detector systems heretofore known. Further, the systems do not take into account many of the variables associated with the actual refrigeration system and do not permit some variation of the refrigeration air temperature being supplied to the frozen food cases. The system, as herein described, in effect, integrates to insure that, in fact, a real alarm condition is extant before generating an alarm signal. This in turn precludes false alarms and in turn the problems of disinterest or lack of concern over the receipt of an alarm signal. The system is designed to preclude spurious alarms and in turn generate an alarm signal only when an actual real alarm condition exists.

It is to be understood that the embodiments of the invention above-described are merely illustrative of the application of the principals of the invention. Reference herein to details of the illustrated embodiment is not intended to limit the scope of the claims, which themselves recite those features regarded as essential to the invention.

We claim:

1. A temperature monitoring system comprising: a plurality of detector units, each of which includes:

temperature measuring means positioned to sense the air temperature of a refrigerated area to generate a temperature alarm signal reflective of a preselected alarm temperature condition, time delay means conductively connected to said temperature measuring means to receive and integrate temperature alarm signals and to transmit a temperature alarm signal after a preselected time delay, a data serializer conductively connected to receive the temperature alarm signal from said time delay means, said data serializer having identification code means to generate a preselected identification code unique to a detector unit, and wherein said data serializer converts said identification code and said temperature alarm signal into a serialized data train, a subcarrier oscillator conductively connected to said data serializer to receive said data train to generate a radio frequency subcarrier signal modulated with said data train signal, a transmitter with antenna means conductively connected to receive said modulated radio frequency subcarrier signal from said subcarrier oscillator to transmit a radio frequency carrier modulated with said modulated radio frequency subcarrier, timing means conductively connected to said temperature measuring means, time delay means and data serializer to supply timing signals thereto to cause intermittant operation thereof in accordance with a preselected schedule, and a first power supply conductively connected to supply power to said temperature measuring means, time delay means, data serializer, subcarrier oscillator transmitter and timing means;

a receiver unit positioned remote from said detector unit, said receiver unit including:

receiver means with antenna means to receive said radio frequency carrier from said transmitter to extract therefrom said modulated radio frequency subcarrier, frequency shift key decoder means conductively connected to said receiver to receive said modulated radio frequency subcarrier therefrom to extract said data train from said subcarrier, serial to parallel converter means conductively connected to said decoder means to receive said data train therefrom and to convert said data train into a plurality of parallel in time data signals reflective of the temperature and the identity of the detector unit related thereto, and a second power supply conductively connected to said receiver, frequency shift key decoder and said serial to parallel converter to supply power thereto; and an alarm unit conductively connected to said serial to parallel converter to receive said data signals therefrom and to said second power supply to receive power therefrom, said unit including:

a temperature alarm tally circuit to receive said data signals and generate an alarm signal indicative of the existence of an alarm condition and the identity of the detector unit from which the alarm condition has been transmitted, indicator means conductively connected to receive said alarm signal to indicate the existence thereof and identify of the detector unit related thereto, and external alarm means to receive said alarm signal and indicate the existence thereof external from the alarm unit.

2. The system of claim 1 wherein said timing means includes means to generate and supply a check pulse at preselected intervals to said data serializer to cause said data serializer to operate by generating said identification code and convert said check pulse signal into a serialized data train for modulation and transmission as a modulated radio frequency signal by said subcarrier oscillator and transmitter, and wherein said alarm unit includes an operational check tally circuit conductively connected to said serial to parallel converter to receive therefrom said operational check pulse signal after reception, demodulation and conversion by said receiver, frequency shift key decoder and serial to parallel converter, respectively, said operational check tally circuit generating a detector operative signal upon receipt of said operational check pulse signal and an alarm signal upon the absence of said operational check pulse signal for a preselected period, wherein said alarm unit further includes indicator means conductively connected to said operational check tally circuit to receive said detector operative signal, and a scanner conductively connected to said indicator means to supply scanning signals thereto, and wherein said operational check tally is conductively connected to said external alarm means to supply said alarm signal thereto.

3. The system of claim 2 wherein said external alarm means includes:

delay means conductively connected to receive alarm signals and delay transmission thereof for a preselected time;

a phone dialer conductively connected to said delay means to receive an alarm signal therefrom and to an external telephone system, and having means to dial and periodically redial a preselected telephone number in said external system for a preselected number of times until answered, and means to deliver an alarm message upon answering.

4. The system of claim 3 wherein said timing means sends said timing pulses to said temperature measuring means, said detector time delay means and said data serializer at a preselected rate of from about one every one minute to about one every ten minutes to cause operation thereof, and wherein said timing means sends said check pulse to said data serializer at a preselected rate of from about one every twelve hours to about one every twenty-four hours.

5. The system of claim 3 wherein said temperature measuring means includes a temperature sensitive thermistor conductively connected to an amplifier set to transmit a too hot signal as the temperature measuring means output signal upon receipt of a preselected temperature reflective signal from said thermistor.

6. The system of claim 3 wherein said detector time delay means has indicator means conductively connected thereto to receive a signal therefrom and indicate the existance of a too hot signal from said temperature sensing means.

7. The system of claim 3 wherein said alarm unit includes an audio alarm connected to receive said alarm signal to generate an audible alarm upon the occurrence thereof.

* * * * * generation of an operational check signal approximately once every 22.8 hours. The pulsing reduces the power drain and extends the battery life of the power supply. Thus, the detector unit 10 is not constrained by any wires, tubes or the like. The unit may be positioned easily and cheaply, as desired.

The power supply 26, as shown in FIG. 4, includes a battery 210. The battery 210 is a conventional dry cell portable battery having an output that is isolated by diode 212 and filtered by capacitor 214. The output of the battery of power supply 26 is supplied to the various components as illustrated in FIG. 1 and as also illustrated in FIGS. 2, 3, 4 and 5.

Figure 5:
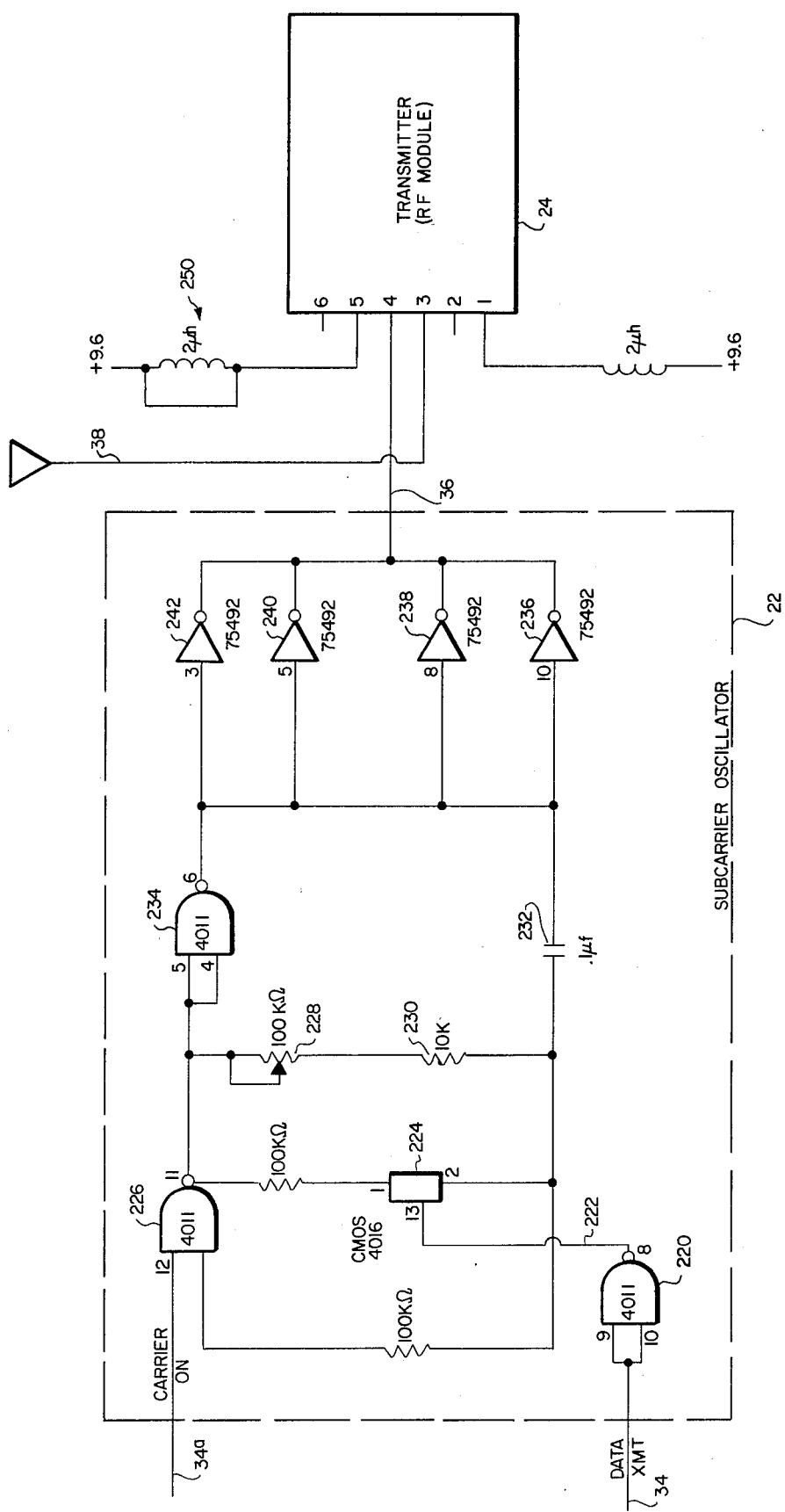
FIG. 5 is a circuit diagram of a subcarrier oscillator and transmitter for use in the detector unit of the temperature monitoring system of the instant invention.

The subcarrier oscillator 22 and the transmitter 24 are shown in FIG. 5. The subcarrier oscillator 22 receives the serialized data train via conductor 34 and an AND gate 220. The output of the AND gate is supplied via conductor 222 to a transmission gate 224. The "carrier-on" signal from the multi-vibrator 176 of the data serializer 20 is also supplied via conductor 34a to an AND gate 226 of the subcarrier oscillator 22. The output of the AND circuit 226 is supplied to an RC network comprised of resistors 228, 230 and capacitor 232, as is the output of the transmission gate 224. The output of the AND gate 226 is also supplied to another AND gate 234 which is connected as an inverter. In operation, the transmission gate 224 and the carrier on-signal gate 226 cause the subcarrier frequency oscillator to generate two tones. For the circuit herein illustrated, the first tone is a 100 hertz tone and the second tone is a 150 hertz tone. The 100 hertz tone lasts for approximately 0.01 milliseconds. The 150 hertz tone lasts for approximately 0.0067 milliseconds. These two tones are supplied through a series of amplifiers 236, 238, 240 and 242 to generate a 50 milliamp output on the conductor 36. That output is in turn supplied directly to the transmitter 24. In effect, the subcarrier oscillator thus generates what may be regarded as a kind of modulated signal wherein the modulations are directly related to the data train data supplied via conductor 34. The output of the subcarrier oscillator is thus deemed to be a modulated subcarrier output supply to the transmitter.

The transmitter 24 is a conventional radio frequency modular transmitter selected to transmit from 70 to 75 megahertz. The transmitter 24, as herein illustrated, has a 2 micro henry choke 250 to isolate radio frequency reflected back into the transmitter. The transmitter receives the output of the subcarrier oscillator 22 via conductor 36 and in turn transmits a 70 megahertz to 75 megahertz oscillating signal reflecting or in effect modulated as per the signal received from the subcarrier oscillator 22 and in direct proportion thereto. The transmitter 24 has associated therewith an antenna 38, as hereinbefore stated. The antenna 38 may be any conventional antenna selected by the user appropriately designed to transmit the 70 megahertz to 75 megahertz signals. The transmitter is preferably of the crystal oscillator type.

Figure 6:
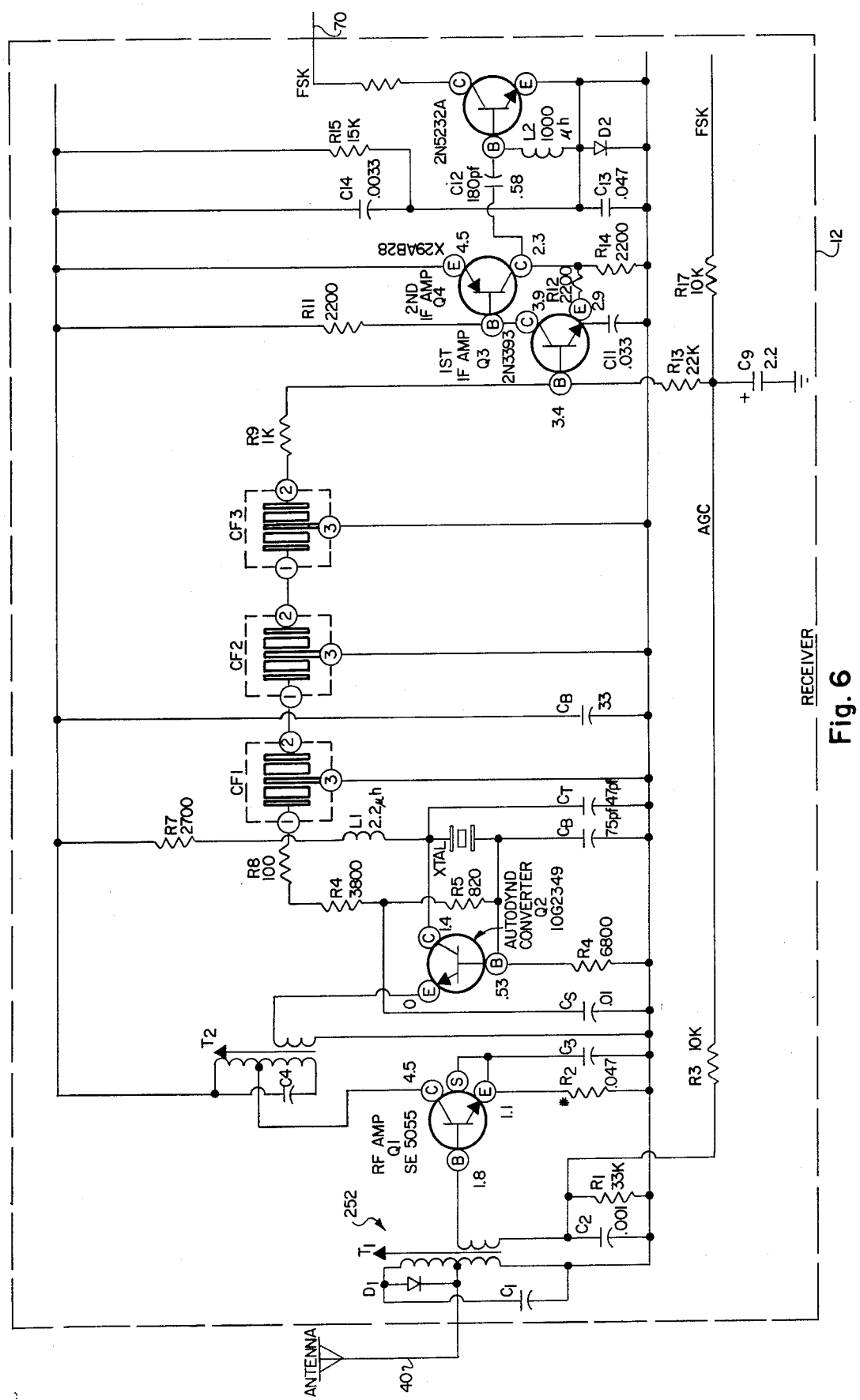
FIG. 6 is a circuit diagram of the RF receiver of the receiver unit of the temperature alarm system of the instant invention.
Figure 7:
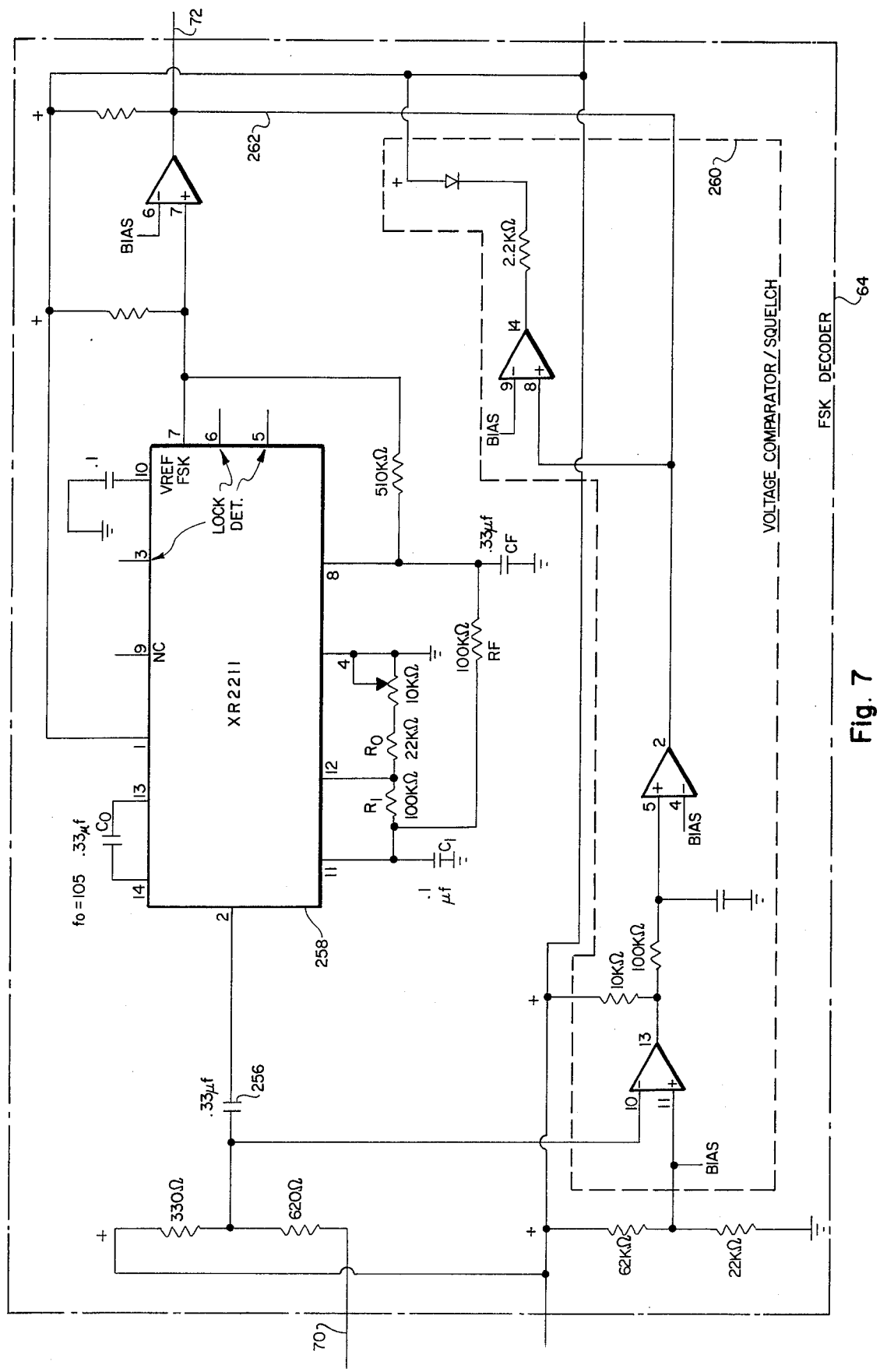
FIG. 7 is a frequency shift key decoder circuit diagram for use in the receiver unit of a temperature alarm system of the instant invention.

The receiver 62 of the receiver unit 12 is shown in more detail in FIG. 6. The receiver 12 receives the transmissions of the transmitter 24 via antenna 40. The radio frequency transmissions received are processed through an isolation transformer and filter arrangement 252 for further demodulation and processing. The output to the frequency shift key decoder 64 is supplied via conductor 70. The output is in effect the demodulated transmitter signal or essentially the same as the subcarrier oscillator output signal.

The output of the receiver 62 is supplied to the frequency shift key (FSK) decoder 64. The alternating 100 hertz and 150 hertz signal is received via conductor 70 and supplied through a filter 256 to a phase locked loop integrated circuit 258. An EXAR brand phase locked loop integrated circuit of the type shown is chosen for simplicity and its capability of operating from an unregulated power supply. The FSK decoder, and in particular the phase locked loop circuit 258, converts the alternating 100 hertz and 150 hertz signals into high and low logic levels constituting a serialized data train comparable, if not identical, to the data serializer output of the detector unit 10. The FSK decoder also has a voltage comparer or squelch circuit 260 connected to sense the input voltage and provide an antisquelch signal at the output of the FSK circuit via conductor 262. The squelch signal prevents weak signals or noise from causing false alarms in the receiver and alarm unit circuitry.

Figure 8:
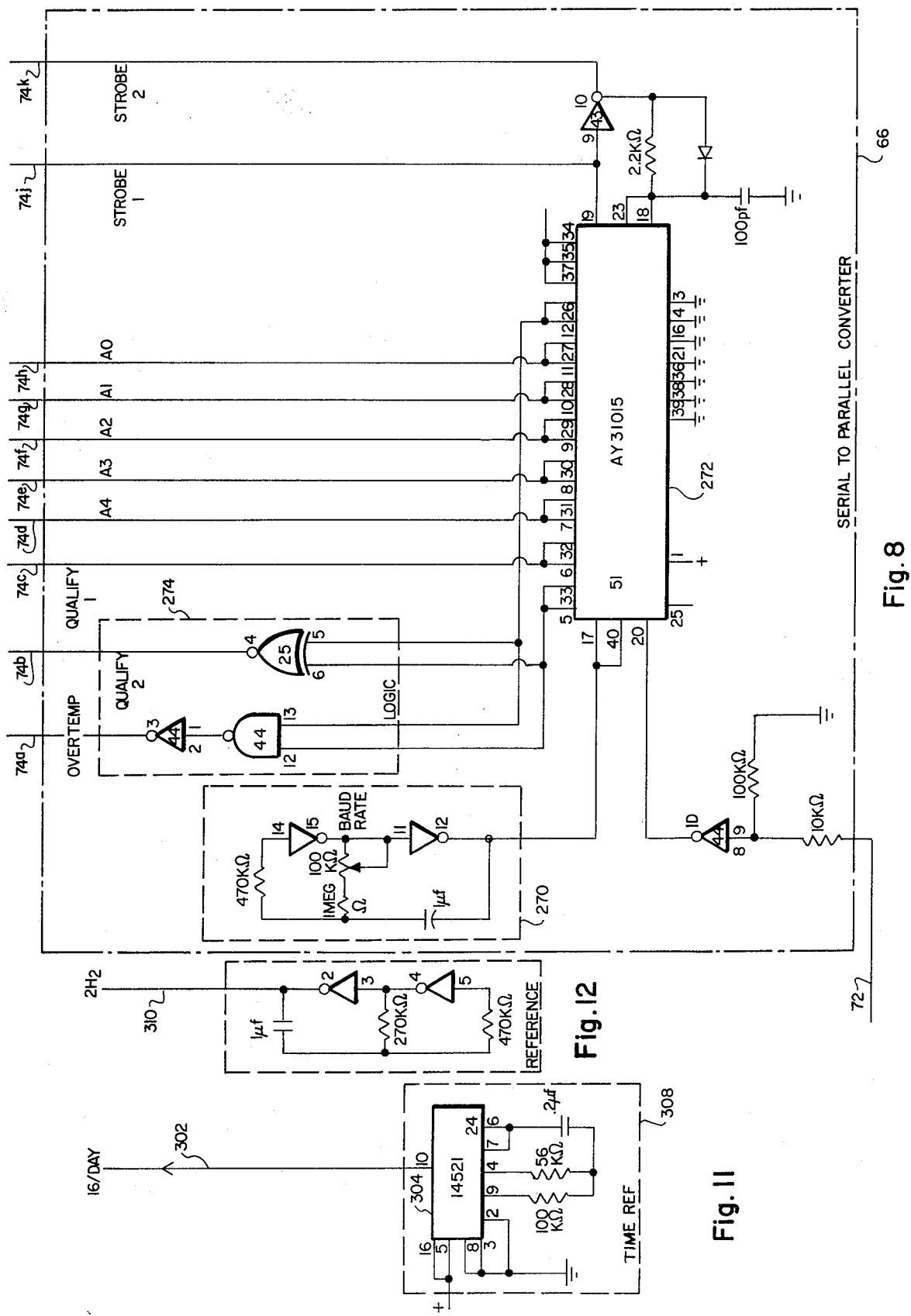
FIG. 8 is a circuit diagram of a serial to parallel converter for use in the receiver unit of the temperature alarm system of the instant invention.

FIG. 8 illustrates a serial to parallel converter 66 receiving the output of the FSK decoder via conductor 72. The serial to parallel converter 66 takes the serial data train from the FSK decoder and converts it into an eight bit data word, which is essentially simultaneous in time or parallel in time. The eight bit data word is supplied to the alarm unit via conductors 74. In FIG. 8, the output is illustrated by conductors 78a through 78h, 74j and 74k. The serial to parallel converter 66 includes a baud rate circuit 270 to supply a reference signal to a reversing shift register 272. The baud rate circuit 270 operates to provide a time reference signal as does the baud rate circuit 174 of the data serializer 20. The shift register 272 output includes an over-temperature signal supplied on conductor 74a, two qualification signals supplied on conductors 74b and 74c, two strobe signals supplied on conductors 74j and 74k, and four identifying signals supplied via conductors 74d through 74h. The over-temperature signal and the second qualification signal are developed in a logic circuit 274, which is used to ascertain the existence of an over-temperature condition or the existence of an operational check signal so that the appropriate signal can be properly directed either to the temperature alarm tally circuit 90 or the operation check tally circuit 92.

Figure 10:
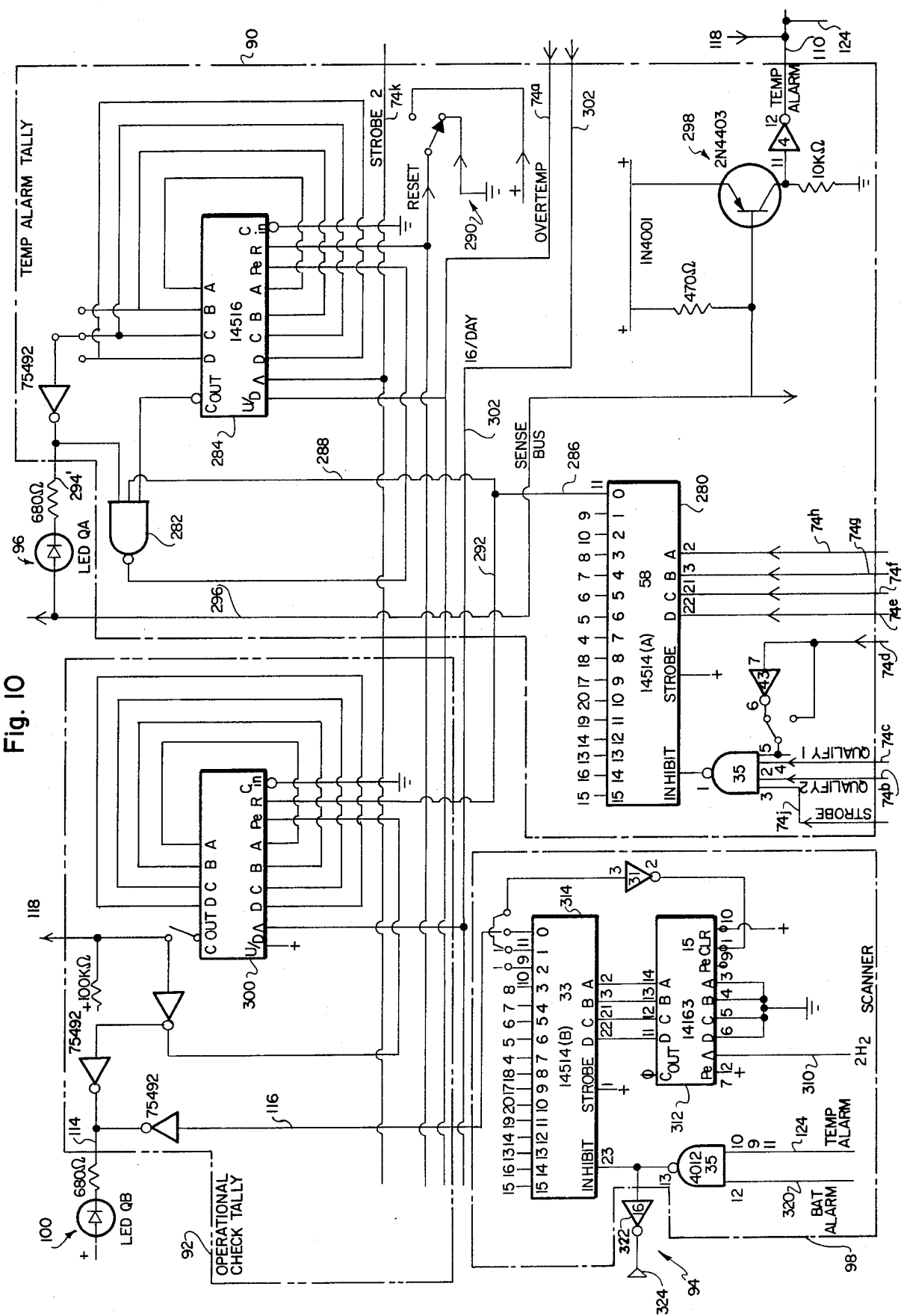
FIG. 10 is a circuit diagram showing the temperature alarm tally circuit, the operational check tally circuit, the indicator means related thereto, as well as the scanner circuit for use in the temperature alarm system of the instant invention.

Referring now to FIG. 10, detailed circuits are depicted for the temperature alarm tally 90, the indicator 96, the indicator 100, the operational check tally circuit 92, and the scanner 98. The temperature alarm tally circuit 90 receives the data pulses from the serial to parallel converter via conductors 74a through 74h and 74j and 74k. The detector identification code is supplied through a series of pulses on conductors 74d through 74h to a decoder 280. The decoder in turn sends an identity signal to a logic circuit 282 related to the temperature alarm tally counter 284 via conductors 286 and 288. As here shown, one temperature alarm tally counter 284 is shown. However, a temperature alarm tally counter 284 with logic circuit 282, a separate indicator 96 and with the related circuitry, including a reset circuitry 290, is provided for each detector 10 of the system. The circuits are repetitive, as known to those skilled in the art, and will be connected to the separate output pins of the decoder 280. The decoder output is also supplied to the operational check tally via conductor 292.

In operation, an alarm signal would be received as an over-temperature signal via conductor 74a. The counter 284 of the temperature alarm tally would increment upward to a count of 4. Upon reaching a count of 4, the counter 284 supplies an output to the indicator 96, which is a light emitting diode via conductor 294. The indicator 96, together with each of the indicators 96 related to each of the detector units 10, are connected to the sensing bus 296. In turn, the signal is supplied to a temperature alarm generator circuit 298. The temperature alarm generator circuit 298 supplies an output via conductor 110 to the five minute delay circuit 102 and to an audio alarm device 94 via conductor 124, as hereinafter discussed.

The temperature alarm tally counter 284 is an up-down counter. Each time a temperature alarm signal is received, it counts up; each time an operational check signal is received, it counts down towards zero. If the counter reaches stage four, the light emitting diode or indicator 96 relating to the particular detector 10 transmitting the alarm signal lights up, and the temperature alarm amplifying circuit supplies a signal to the audio alarm 94 to cause an audible alarm. The counting technique is provided in order to prevent false alarms.

The operational check tally circuit 92 has a counter 300 and other components similar to those used in the temperature alarm tally circuit 90. Here also, the operational check tally circuit is shown for only one detector unit. A matching plurality of tally circuits 92 with related circuitry and indicator light emitting diode 100 are provided for each detector unit 10. Each time an operational check transmission is received, the counter circuit 300 is reset to zero. The counter 300 is increment upward sixteen times a day from a counting signal received via conductor 302 supplied by another counter 304 in a time reference circuit 308, shown in FIG. 11. The counting signal is, of course, supplied to each of the operational check tally counters 300 for the plurality of detectors 10. If the counter 300 reaches a count of 15, it supplies an output to its corresponding light emitting diode 100 and to the five minute temperature delay 102 via conductor 118. At the same time, an alarm signal is supplied via conductor 124 to the audio alarm 94. The scanner 98, is here shown in FIG. 10, is receiving a 2 hertz signal from a reference circuit shown in FIG. 12 via conductor 310. The reference signal is received by a counter 312 which in turn supplies a coded pulse signal to a decoder 314. The decoder 314 supplies enable signals and flashing signals to the operational check tally via conductor 116.

As here shown, the audio alarm 94 receives a signal from conductor 124. It also receives a signal from a battery alarm circuit via conductor 320, as more fully discussed hereinafter. The audio alarm 94 is comprised of an amplifier 322 and an audio speaker 324 to generate an audible tone in the vicinity of the alarm unit.

FIG. 13 depicts the time delay circuit 102 which may be used in the instant invention. The time delay is imposed to provide further protection against spurious or random alarms. The time delay receives its input via conductor 110 and supplies an output via conductor 120 to the phone dialer 104 after a preselected time delay, which may be five minutes.

Figure 9:
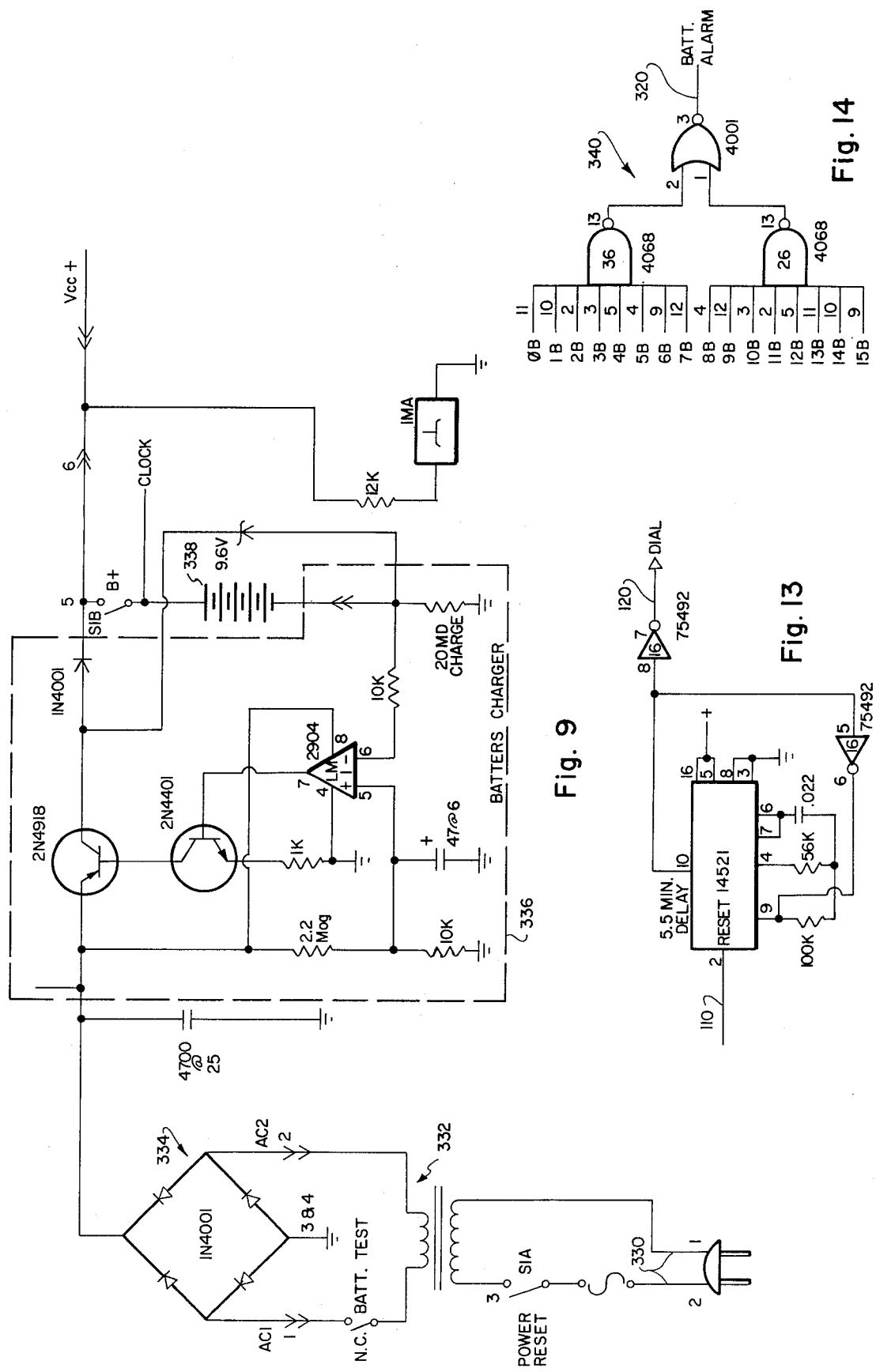
FIG. 9 is a circuit diagram of a power supply to supply power to both the receiver unit and the alarm unit of the temperature alarm system of the instant invention.

FIG. 9 depicts the power supply 68 which is used to supply power to receiver unit 12 and the alarm unit 14. The power supply 68 preferably receives 115 volt AC power from a conventional external power supply, such as a wall plug, via conductor 330. The input power passes through an isolation stepping transformer 332 to a full wave rectifier 334. The output thereof passes through a battery charger 336 which provides a continuous charge to a dry cell battery 338. The battery supply output is supplied at various components thoughout the receiver unit 12 and alarm unit 14 via a plurality of conductors, which appear in the respective circuit diagrams herein. A battery alarm signal is also generated. An alarm circuit is shown in FIG. 14. It receives input signals from various test points throughout the circuits of the receiver unit 12 and alarm unit 14 to test the existance of the proper voltage supply. The signal is passed through logic circuitry 340 to supply an output signal via conductor 320 to the audio alarm 94, as illustrated in FIG. 10.

Figure 15:
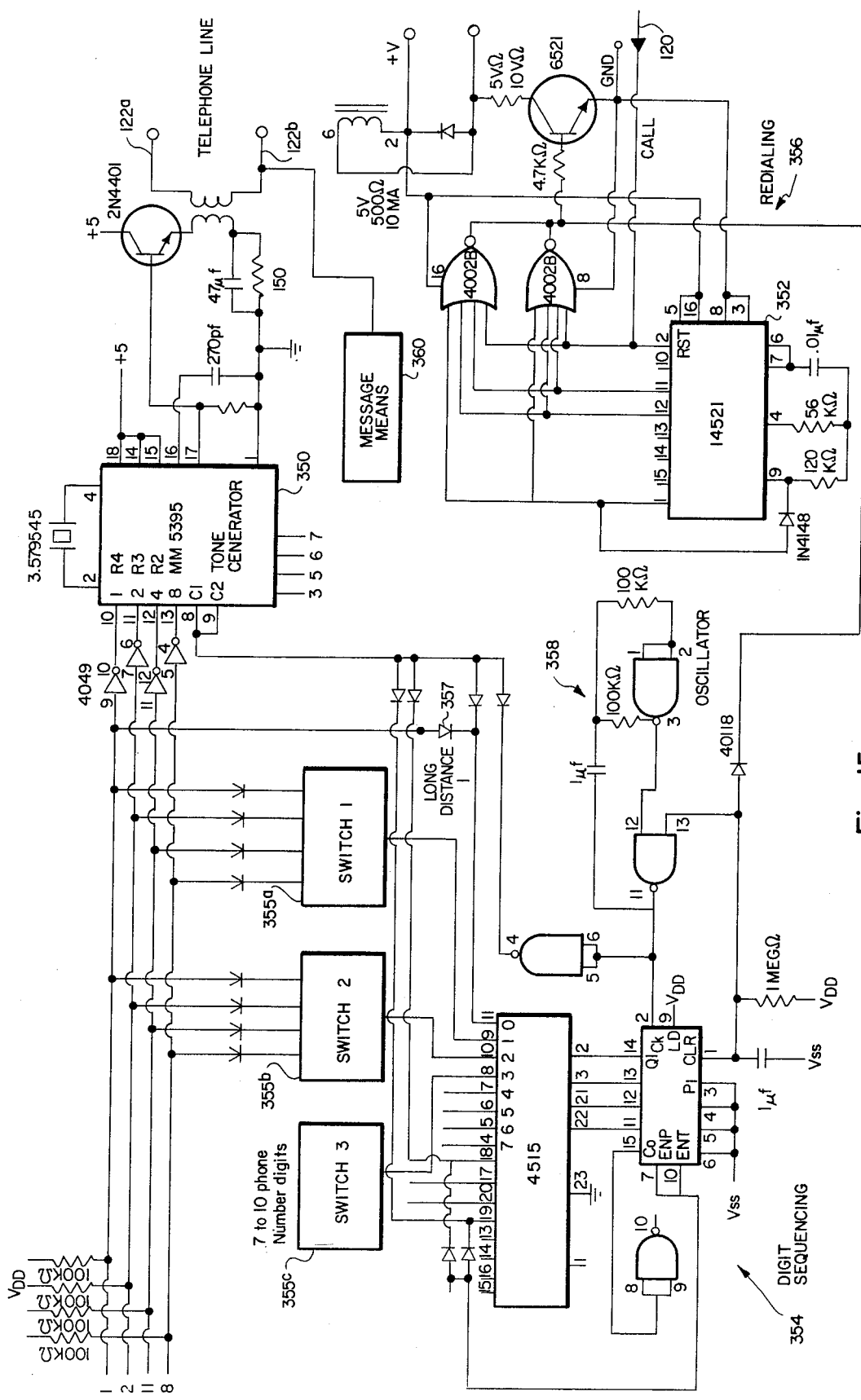
FIG. 15 is a circuit diagram of a telephone dialer for use in the alarm circuit of the temperature alarm system of the instant invention.

The phone dialer 104 is illustrated in FIG. 15. The phone dialer 104 is a touch-tone type built around a tone generator 350. The input from the five minute time delay circuit 102 is received via conductor 120 into a redialing circuit 356. The redialing circuit 356 has a counter 352. Once the dialing circuit has been started by an input signal from the five minute time delay 102, the redialing circuit generates a dialing order signal to a digit sequencing circuit 354 initially upon receipt of the alarm signal from the time delay circuit 102 and thereafter every fifteen minutes for up to fifteen consecutive times. An oscillator circuit 358 supplies a time signal to the digit sequencing circuit 354 to determine how long each Touch-Tone will exist or last for each of the telephone digits to be dialed. The digit sequencing circuit 354, in effect, causes the separate switches 355a through 355n for each of the needed phone numbers to operate to supply the signals to the tone generator 350 for purposes of transmitting the appropriate Touch-Tone to the telephone line 122a and 122b. In particular, a series of 7 or 10 switches 350a though 350n are provided in which the user may set an appropriate telephone number, the first three digits would, of course, be the area code number if an out-of-area long distance call is desired. Similarly, a long distance preceding number one is automatically provided by the digit sequencing through a diode 357 if long distance is selected. The remaining seven digits are for the typical seven digit telephone number. Thus, in operation, the digit sequencing circuit 354 causes first a long distance number one to be generated by the tone generator and transmitted through and to the telephone line 122a and 122b. Thereafter, it causes each switch to be sampled so that the telephone number preselected will be generated by the tone generator and transmitted in proper sequence to the telephone line 122a and 122b. When the telephone number that is dialed is answered, message means 360 may be optionally provided to provide a message such as a taped audio message or a simple tone signal to indicate to the answering party the existance of an alarm condition.

In operation, the temperature measurement is made by the temperature measuring circuit 16 of each of the detector units 10. If the temperature is detected to be too hot or above the particular set point desired, a too hot measurement is loaded into a counter 152. When the count of 15 is reached, an alarm transmission is made in five minute intervals until such time as the temperature drops below the alarm set point. The data serializer 20 includes a detector identification code and serializes the data. The subcarrier oscillator 22 is a frequency shift key generator, which in turn shifts the frequency in relationship to the data. The transmitter, which operates in the 72 megahertz to 75 megahertz band is modulated by the subcarrier frequency rate so that the signal being transmitted is modulated by the 100 hertz to 150 hertz signal, as well as by the period of time in which